United States Patent [19]
Kramer

[11] Patent Number: 6,082,235
[45] Date of Patent: Jul. 4, 2000

[54] DEVICE FOR THE MACHINING OF TUBE ENDS

[75] Inventor: Herbert Kramer, Singen, Germany

[73] Assignee: Georg Fischer Rohrverbindungstechnik GmbH, Singen, Germany

[21] Appl. No.: 09/029,272

[22] PCT Filed: Jul. 18, 1997

[86] PCT No.: PCT/IB97/00898

§ 371 Date: May 18, 1998

§ 102(e) Date: May 18, 1998

[87] PCT Pub. No.: WO98/06526

PCT Pub. Date: Feb. 19, 1998

[30]         Foreign Application Priority Data

Aug. 12, 1996 [DE] Germany .......................... 196 33 102

[51] Int. Cl.[7] .................................................... B23B 5/16
[52] U.S. Cl. ................................ 82/113; 82/128; 82/142; 82/149
[58] Field of Search .................................. 82/113, 54, 58, 82/70.2, 72, 93, 142, 128, 112, 149; 407/34, 35, 101, 103; 408/79, 80; 409/182, 179, 178

[56]                 References Cited

U.S. PATENT DOCUMENTS

| | | | |
|---|---|---|---|
| 1,565,790 | 12/1925 | Carter | 409/182 |
| 3,115,055 | 12/1963 | Sepulveda | 82/128 |
| 4,186,630 | 2/1980 | Lindhag | 82/113 |
| 4,202,650 | 5/1980 | Erickson | 407/101 X |
| 4,437,366 | 3/1984 | Astle | 82/113 |
| 4,739,682 | 4/1988 | Birkestrand | 82/113 |
| 4,758,121 | 7/1988 | Kwech | 82/113 X |
| 5,207,253 | 5/1993 | Hoshino et al. | 409/182 X |
| 5,609,081 | 3/1997 | Lin | 82/113 X |

FOREIGN PATENT DOCUMENTS

| | | | |
|---|---|---|---|
| 2756951 | 6/1979 | Germany | 82/113 |

*Primary Examiner*—Henry W. H. Tsai
*Attorney, Agent, or Firm*—Bachman & LaPointe, P.C.

[57]                     ABSTRACT

There is proposed an apparatus for machining pipe ends having a motor, a gearing assembly, and a clamping means for clamping a pipe end to be machined on the apparatus, the apparatus having a hollow rod, a tool support with a tool holder, characterized by the fact that the motor and the gearing assembly are arranged alongside of each other and that all units with the exception of the tool support are surrounded by a housing and thus form a compact and handy arrangement, and that the housing has a bottom surface which serves as standing surface and simplifies the handling of the device. The tool holder is provided with a cutting plate which is developed as turnable tip which has at least two active cutting edges.

3 Claims, 2 Drawing Sheets

DEVICE FOR THE MACHINING OF TUBE ENDS

BACKGROUND OF THE INVENTION

The present invention relates to a pipe-end machining device (apparatus for machining pipe ends) provided with clamping means for clamping the pipe-end machining device securely on a pipe end which is to be machined.

Portable machining devices for machining the ends of tubular workpieces, such as pipes for instance, are known as preparatory step for welding or for other machining operations. These devices are employed mainly for the on-the-spot working of endless pipes or pipes which have already been laid, for example in case of repair. For this, it is necessary that the corresponding working devices be compact and easy to handle and use, but nevertheless of versatile development. Furthermore, known pipe-end machining devices having tool holders and cutting tools in order to hold the pipe-end surfaces in fixed position and machine them by means of the cutting tool. As a rule, known pipe-end machining devices have a drive unit by which the drive torque is transmitted to a driven hollow shaft via a bevel gearing transverse to the drive axis. A tool holder is firmly attached to the hollow shaft. The hollow shaft is mounted for rotation around a rod. This rod is hollow and contains a spindle which is operatively connected with clamping means. By rotation of the spindle, clamping jaws within the pipe are pressed radially against the inner wall of the pipe and the pipe-end machining device is thus positioned on the pipe. At the end of the hollow rod there is a thread an which the pipe-end machining device with the tools arranged on the tool holder is fed by a feed mechanism towards the pipe end.

Accordingly, it is an object of the present invention to improve known portable pipe-end machining devices so as to provide easier handling for the user both with regard to the operation of the device itself and upon the changing of the tool.

SUMMARY OF THE INVENTION

The foregoing object is achieved by way of the present invention wherein an apparatus for machining the ends of pipes comprises a motor, a gearing assembly and a clamping means for securely clamping a pipe end to be machined on the apparatus for machining the pipe end. The apparatus comprises a hollow rod and a tool support with a tool holder. The motor and the gearing assembly are arranged alongside of each other. All units, with the exception of the tool holder, are enclosed by a housing and thus form a compact and handy arrangement. The housing has a bottom surface which serves as standing surface and simplifies the handling of the apparatus. Preferably, the tool holder comprises a cutting plate which is designed as turnable tip member having at least two active cutting edges.

Further advantageous features of the invention can be noted from the following detailed description.

BRIEF DESCRIPTION OF THE DRAWINGS

A preferred embodiment will be explained in detail with reference to the accompanying drawings, wherein.

DETAILED DESCRIPTION

Figure 1:
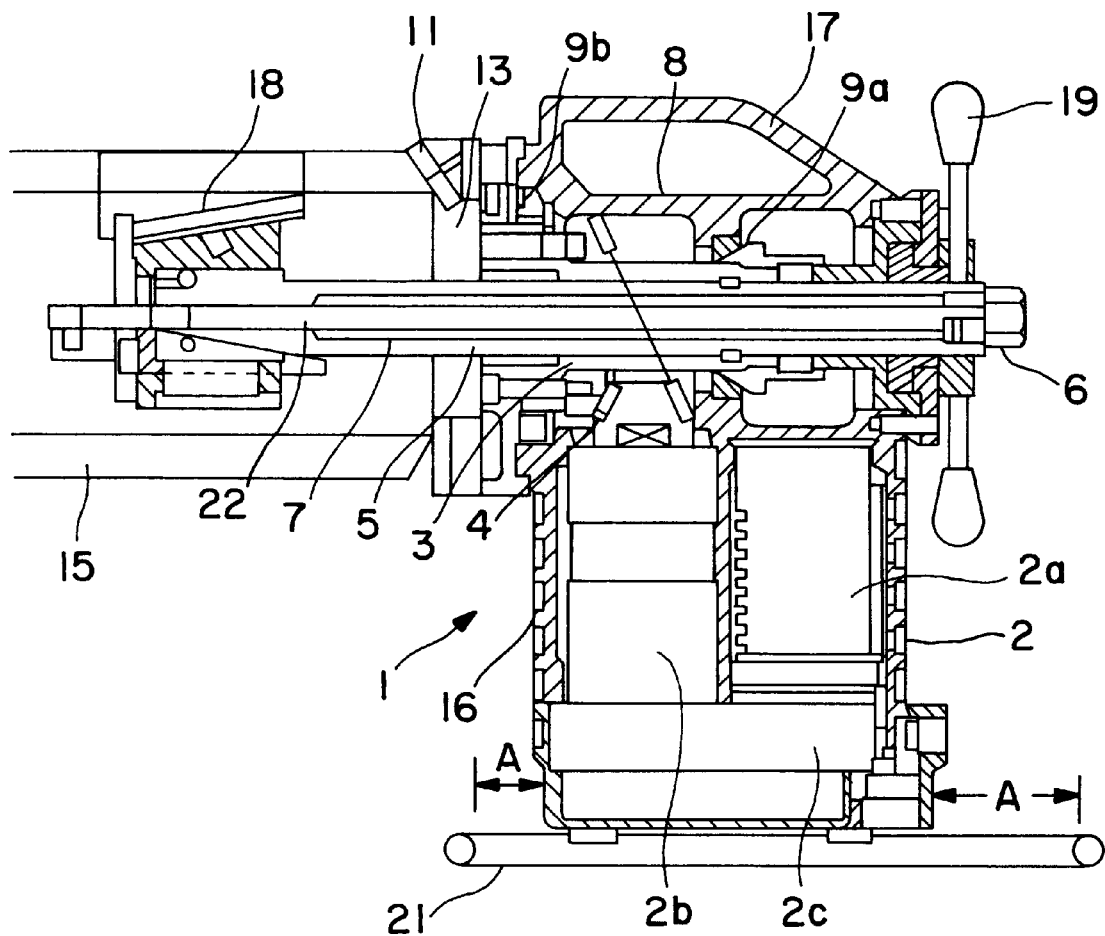
FIG. 1 shows a pipe-end machining device in accordance with the invention, partially in section.

FIG. 1 shows a pipe-end machining device 1 in accordance with the invention. A drive unit 2 has a pneumatic or electric motor 2a with a drive shaft 3. The transmission of the torque is effected from the drive shaft 3 to a driven hollow shaft 5 by means of a gearing mechanism 4. The shaft arrangement is mounted free of clearance, which leads to an improved quality of the cutting. The hollow shaft 5 is rotatably mounted by means of a plain gearing 6 on a hollow rod 7. At one end of the hollow shaft 5 there is, at the end side, a tool support 13. Within the hollow rod 7 there is a spindle 22 which cooperates with clamping jaws 18 within a pipe 15 which is to be machined, so as to position the pipe for the machining. By turning a wheel 19, the clamping jaws 18 present within the pipe are pressed against the inside wall of the pipe. The pipe-end machining device 1 is now clamped fast on the pipe 15.

The hollow shaft 5 is supported in axial and radial directions with respect to the housing 8 by a rolling bearing arrangement 9a, 9b.

Motor 2a and gearing assembly 26 are arranged alongside of each other and are operatively connected to each other by a toothed belt drive 2c and are also located below the hollow shaft 5 as shown in FIG. 1. The devices described are surrounded by a housing 16. The housing has two handles 17 and 21. The handle 21 is developed as a loop and is fastened to the lower part of the housing 16 and a gap "A" is formed between the housing and an inner surface of the loop handle 21 for easy grasping of the apparatus when transporting.

The loop-shaped part serves as resting or supporting element for the entire pipe-end machining device. On the bottom part of the housing there is an operating element (not shown) which serves for mechanical unlocking and locking in the form of an open and closed choke.

Figure 2:
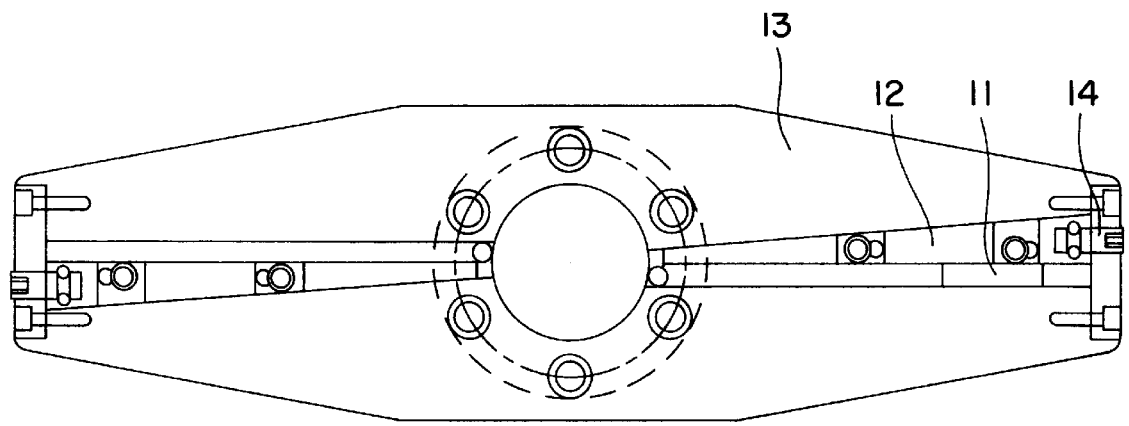
FIG. 2 is a top view of a tool support of the pipe-end machining device.

The tool holder 11, as can be noted from FIG. 2, is fastened in the tool support 13 by means of a wedge-shaped part 12 in groove 28. By tightening the screw 14, the wedge-shaped part 12 is moved in radial direction into the tool support, as a result of which the tool holder 11 is clamped in position. The advantage of this design over traditional clamping screws is that the tool is fixed in position better due to the larger clamping surface, which leads to a reduction in the vibration and thus to machining of a better quality. Possibly dimensional settings of the cutting tool in accordance with the diameter of the pipe to be machined are possible in infinitely variable manner.

Figure 3:
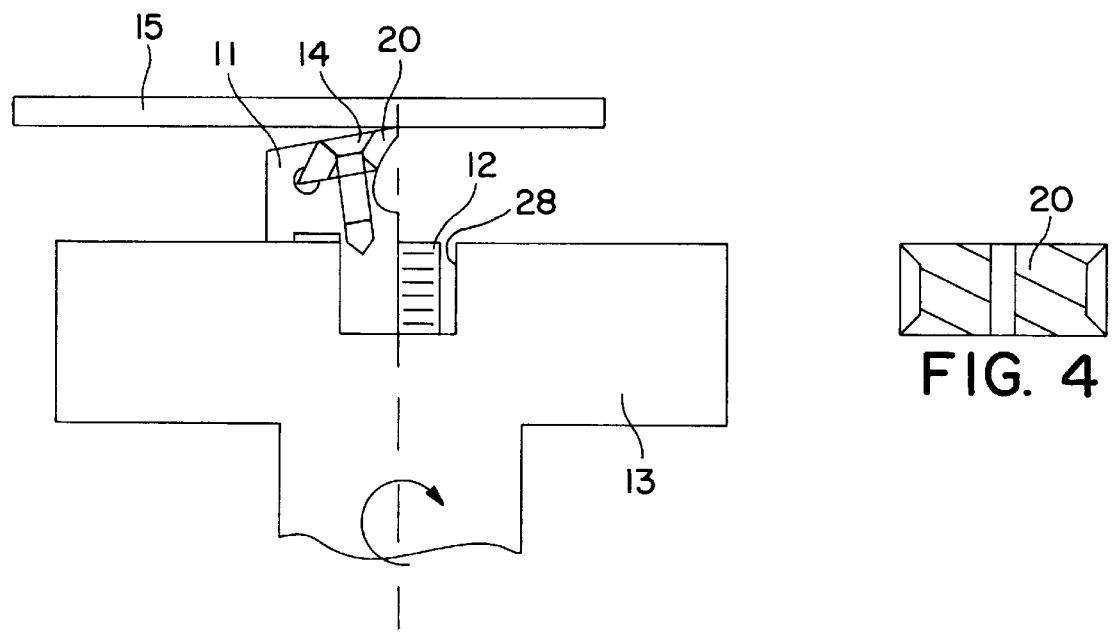
FIG. 3 is a section through the tool support which the cutting tool clamped in position, seen along the line A—A.
Figure 4:
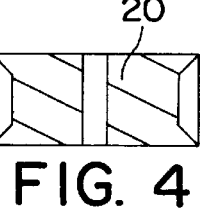
FIG. 4 is a section through the cutting tool.

FIG. 3 is a section through the tool support 13 with the tool holder 11 held in position by means of the wedge-shaped part 12. The wedge-shaped part is tapered in radial direction. The depthwise pulling action is also thus assured. A cutting plate 20 is provided in the tool holder 11 by means of a screw 14. The cutting plate is developed as a turnable tip and has four active cutting edges. This can be noted from FIG. 4. All four cutting edges are ground for use for machining. If necessary, i.e. when an edge becomes dull, a new, unused cutting edge can be brought into use within a very short period of time by simply turning it. Since four cutting edges are provided, there is a four-times longer life than in the case of traditional cutting elements where, as a rule, only a single use of the cutting element is provided for. Furthermore, it is merely necessary in each case to loosen a screw and tighten it again. In this way the repositioning of the tool holder which is customarily necessary upon the changing is dispensed with. Time and money are saved.

What is claimed is:

1. A transportable apparatus for machining pipe-ends comprising: a motor, a gearing assembly arranged alongside the motor, a tool support, clamping means for securely clamping a pipe end to be machined proximate to the tool support, a housing having an external periphery and a first handle thereof; said housing enclosing said motor and gearing to form a compact and stable arrangement, wherein the housing has a bottom surface and a second handle for transporting the apparatus is fixed to the bottom surface, the second handle being in the form of a loop which defines a supporting area below the bottom surface of the housing and includes a portion which extends beyond the periphery of the housing for supporting the apparatus in a stable manner wherein a gap is formed between the housing and the portion of the second handle for easy grasping when transporting the apparatus.

2. A transportable apparatus for machining pipe-ends comprising: a motor, a gearing assembly arranged alongside the motor, a shaft driven by the motor wherein the motor and gearing assembly are located below the shaft, a tool support mounted on the shaft, clamping means for securely clamping a pipe end to be machined proximate to the tool support, a housing having a first handle, said housing enclosing said motor and gearing to form a compact and stable arrangement, wherein the housing has a bottom surface and a second handle for transporting the apparatus which is fixed to the bottom surface, the second handle being in the form of a loop which defines a supporting area below the bottom surface of the housing for supporting the apparatus in a stable manner.

3. Transportable apparatus for machining pipe-ends comprising: a motor, a gearing assembly arranged alongside the motor, a shaft driven by the motor, wherein the motor and gearing are located below th e shaft, a tool support mounted on the shaft, clamping means for securely clamping a pipe end to be machined proximate to the tool support, a housing having a first handle, said housing enclosing said motor and gearing to form a compact and stable arrangement, wherein the housing has a bottom having an interior surface and an exterior surface wherein a second handle for transporting the apparatus is fixed to the bottom exterior surface and the motor and gearing assembly are supported on the bottom interior surface, the second handle being in the form of a loop which defines a supporting area below the bottom surface of the housing for supporting the apparatus in a stable manner.

* * * * *